(12) United States Patent
Dasika et al.

(10) Patent No.: US 11,494,188 B2
(45) Date of Patent: Nov. 8, 2022

(54) PREFETCH STRATEGY CONTROL FOR PARALLEL EXECUTION OF THREADS BASED ON ONE OR MORE CHARACTERISTICS OF A STREAM OF PROGRAM INSTRUCTIONS INDICATIVE THAT A DATA ACCESS INSTRUCTION WITHIN A PROGRAM IS SCHEDULED TO BE EXECUTED A PLURALITY OF TIMES

(71) Applicant: ARM LIMITED, Cambridge (GB)

(72) Inventors: Ganesh Suryanarayan Dasika, Austin, TX (US); Rune Holm, Cambridge (GB); David Hennah Mansell, Cambridge (GB)

(73) Assignee: ARM LIMITED, Cambridge (GB)

( * ) Notice: Subject to any disclaimer, the term of this patent is extended or adjusted under 35 U.S.C. 154(b) by 1489 days.

(21) Appl. No.: 14/061,837

(22) Filed: Oct. 24, 2013

(65) Prior Publication Data

US 2015/0121038 A1    Apr. 30, 2015

(51) Int. Cl.
*G06F 9/345* (2018.01)
*G06F 9/38* (2018.01)

(52) U.S. Cl.
CPC .......... *G06F 9/3455* (2013.01); *G06F 9/383* (2013.01); *G06F 9/3851* (2013.01); *G06F 9/3887* (2013.01)

(58) Field of Classification Search
CPC .............. G06F 9/383; G06F 12/0862; G06F 9/00–3897
See application file for complete search history.

(56) References Cited

U.S. PATENT DOCUMENTS

| | | | |
|---|---|---|---|
| 6,260,116 B1 * | 7/2001 | Davis | G06F 9/325 711/137 |
| 6,571,318 B1 | 5/2003 | Sander et al. | |
| 7,103,757 B1 * | 9/2006 | Kashyap | G06F 9/30181 712/207 |
| 8,516,226 B1 * | 8/2013 | Collard | G06F 9/3808 711/137 |
| 2004/0123041 A1 * | 6/2004 | Krishnaiyer | G06F 8/4442 711/137 |

(Continued)

FOREIGN PATENT DOCUMENTS

CN        102023931        4/2011

OTHER PUBLICATIONS

H. Al-Sukhni, I. Bratt and D. A. Connors, "Compiler-directed content-aware prefetching for dynamic data structures," 2003 12th International Conference on Parallel Architectures and Compilation Techniques, 2003, 10 pages.*

(Continued)

*Primary Examiner* — Keith E Vicary
(74) *Attorney, Agent, or Firm* — Nixon & Vanderhye, PC

(57) ABSTRACT

A single instruction multiple thread (SIMT) processor includes execution circuitry, prefetch circuitry and prefetch strategy selection circuitry. The prefetch strategy selection circuitry serves to detect one or more characteristics of a stream of program instructions that are being executed to identify whether or not a given data access instruction within a program will be executed a plurality of times. The prefetch strategy to use is selected from a plurality of selectable prefetch strategies in dependence upon the detection of such detected characteristics.

11 Claims, 3 Drawing Sheets

(56) References Cited

U.S. PATENT DOCUMENTS

| | | | | |
|---|---|---|---|---|
| 2006/0253656 | A1* | 11/2006 | Donawa | G06F 12/0862 711/137 |
| 2007/0113059 | A1* | 5/2007 | Tran | G06F 9/325 712/241 |
| 2008/0288751 | A1 | 11/2008 | Kocev | |
| 2009/0240931 | A1* | 9/2009 | Coon | G06F 9/30054 712/234 |
| 2011/0202725 | A1* | 8/2011 | Rose | G06F 9/30021 711/118 |
| 2012/0005461 | A1* | 1/2012 | Moir | G06F 9/3863 712/228 |
| 2012/0233441 | A1* | 9/2012 | Barreh | G06F 9/3851 712/206 |
| 2013/0262779 | A1 | 10/2013 | Bobba et al. | |
| 2013/0339689 | A1* | 12/2013 | Srinivasan | G06F 9/3867 712/233 |

OTHER PUBLICATIONS

B. Panda and S. Balachandran, "Hardware prefetchers for emerging parallel applications," 2012 21st International Conference on Parallel Architectures and Compilation Techniques (PACT), Minneapolis, MN, Sep. 19-23, 2012, pp. 485-485.*

Robert Cooksey, Stephan Jourdan, and Dirk Grunwald. 2002. A stateless, content-directed data prefetching mechanism. In Proceedings of the 10th international conference on Architectural support for programming languages and operating systems (ASPLOS X). ACM, New York, NY, USA, 279-290. (Year: 2002).*

Lee et al., "Many-Thread Aware Prefetching Mechanisms for GPGPU Applications", *IEEE/ACM International Symposium on Microarchitecture (MICRO)*, Dec. 2010, pp. 1-12.

UK Search Report dated Feb. 23, 2015 in GB 1415068.4, 3 pages.

Woo et al., "COMPASS: A Programmable Data Prefetcher Using Idle GPU Shaders," published in ASPLOS'10, Proceedings of the fifteenth edition of ASPLOS on Architectural support for programming languages and operating systems, Mar. 13-17, 2010, 13 pages.

Chen et al., "An Adaptive Data Prefetcher for High-Performance Processors", published in 2010 10th IEEE/ACM International Conference on Cluster, Cloud and Grid Computing (CCGrid), May 17-20, 2010, 10 pages.

Jog et al., "Orchestrated Scheduling and Prefetching for GPGPUs", published in the Proceedings of ISCA-2013, 40th International Symposium on Computer Architecture (ISCA), Jun. 2013, pp. 1-12.

Chinese First Office Action dated Jul. 4, 2018 in CN Application No. 201410515306.0 and English translation, 19 pages.

Second Office Action dated Feb. 27, 2019 in CN Application 201410515306.6 and English translation, 10 pages.

Examination Report, GB Application 1415068.4 dated Jan. 20, 2020, 4 pages.

Notice Requesting Submission of Opinion in related Korean Application No. 10-2014-0134793 dated Oct. 30, 2020.

* cited by examiner

PREFETCH STRATEGY CONTROL FOR PARALLEL EXECUTION OF THREADS BASED ON ONE OR MORE CHARACTERISTICS OF A STREAM OF PROGRAM INSTRUCTIONS INDICATIVE THAT A DATA ACCESS INSTRUCTION WITHIN A PROGRAM IS SCHEDULED TO BE EXECUTED A PLURALITY OF TIMES

BACKGROUND OF THE INVENTION

Field of the Invention

This invention relates to the field of data processing systems. More particularly, this invention relates to the field of prefetch strategy control within data processing systems incorporating data prefetching mechanisms.

Description of the Prior Art

It is known to provide data processing systems which incorporate prefetching mechanisms for prefetching data values. Such prefetching mechanisms seek to identify patterns of data accesses that arise and then to prefetch data values from a memory such that the latency associated with accessing those data values is reduced when, and if, those data values are subsequently accessed.

SUMMARY OF THE INVENTION

Viewed from one aspect the present invention provides an apparatus for processing data comprising:

instruction execution circuitry configured to execute in parallel a plurality of threads of program execution, each of said plurality of threads corresponding to a stream of program instructions;

prefetch circuitry configured to prefetch data values from memory addresses within a memory in accordance with a selected prefetch strategy that is one of a plurality of selectable prefetch strategies; and prefetch strategy selecting circuitry coupled to said instruction execution circuitry and to said prefetch circuitry and configured:

(i) to detect one or more characteristics of said stream of program instructions indicative of a probability that a given data access instruction within a program will be executed a plurality of times; and (ii) to select said selected prefetch strategy from among said plurality of selectable prefetch strategies in dependence upon said one or more characteristics.

The present technique recognises that a single prefetch strategy selected for use by the prefetch circuitry may be suited for some types of execution but not suited for other types of execution. More particularly, the present technique recognises that different types of prefetch strategy may be selected and used in dependence upon whether or not a given instruction within a program thread of a multithreaded processor will execute a plurality of times. The prefetch strategy selecting circuitry detects one or more characteristics of the stream of program instructions being executed which is indicative of a given data access instruction being executed a plurality of times and then uses this information to switch the prefetch strategy in use.

The present technique has particular use in the context of a single instruction multiple thread (SIMT) processor in which the plurality of threads execute a common sequence of program instructions in lockstep. Within such an environment, prefetching may be performed even when there is no repeated access of a given data access instruction providing an appropriate prefetch strategy is selected. Accordingly, detection of whether or not a given data access instruction is repeatedly executed may be used as a useful selection metric to allow for the use of an appropriate prefetch strategy.

A SIMT processor will typically include instruction decoder circuitry shared between the plurality of threads so as to reduce hardware and processing overhead. Another characteristic of SIMT processors is that the plurality of threads which execute do not have any data dependence between the plurality of threads such that they can execute in parallel.

While it will be appreciated that the above techniques have particular utility for SIMT processors, the present techniques may also be used with advantage in other types of processors such as fine grained multithreaded processors in which multiple threads (of typically independent program blocks) are interleaved for execution by a common set of hardware at a fine level of granularity (e.g. a single or handful of instructions at a time).

The characteristics that are detected to determine whether a given access instruction is repeatedly executed can take a variety of different forms and may be deterministic of such access instruction being repeatedly executed or may alternatively indicate this in a probabilistic manner, e.g. indicate that such execution is likely to be occurring but not definite.

One form of characteristic which may be employed to select between prefetch strategies and which is associated with a relatively low overhead implementation is detecting whether or not any backward branches instructions are executed. An instruction stream which includes backward branches is likely to include repeated data access instructions and accordingly may be used to select the prefetch strategy use. Another form of characteristic would be the detection of the execution of a program loop (which may involve detection of a backward branch instruction in some embodiments).

Another example characteristic which may be indicative of the execution of a given access instruction multiple times is that execution of a given thread includes greater than a threshold number of program instructions being executed before termination of that thread. Threads which take longer to execute typically include loops that involve repeated execution of a given access instruction and accordingly this may be used to select the prefetch strategy employed.

In other embodiments it is possible to utilise look up circuitry which is configured to detect repeated execution within one of the program threads of a given data access instruction. Such lookup circuitry may compare program counter values for access instructions encountered to see if these are repeatedly executed. One hardware efficient way of performing such lookups is to employ Bloom filter circuitry.

The plurality of selectable prefetch strategies between which a selection is made can include a variety of different strategies and a variety of different numbers of strategies. One form of implementation with a relatively low overhead, and yet which realises a worthwhile advantage, is when the plurality of selectable prefetch strategies include a short-running strategy adapted to predict data values when the stream of program instructions does not contain a given data access instruction executed a plurality of times and a long-running strategy adapted to predict data values to prefetch when the stream of program instructions does include a given data access instruction executed a plurality of times.

As examples of the short-running strategy and the long-running strategy, the short-running strategy may concentrate purely upon stride patterns within memory addresses for memory accesses being performed independent upon the thread from which those memory accesses originate, as there may be a pattern within the memory accesses which can be exploited by the prefetch circuitry even though the individual threads do not contain data access instructions which are repeatedly executed. There may be a pattern of memory accesses which can be exploited which arises due to the relationship between the different threads which are being executed in parallel. An example of a long-running strategy which may exploit the patterns of data accesses which emerge due to the behaviour within a given thread is one which utilises a thread identifier and potentially a program counter value to identify stride patterns which emerge for a given thread.

In some embodiments the prefetch strategy selecting circuitry may be configured to select the short-running strategy as a default strategy and then to switch to the long-running strategy upon detection of the one or more characteristics indicating that there is repeated execution of a given data access instruction. This allows the possibility for exploiting the short-running strategy even if there is no pattern emerging which can be exploited using a long-running strategy.

Viewed from another aspect the present invention provides an apparatus for processing data comprising:

instruction execution means for executing in parallel a plurality of threads of program execution, each of said plurality of threads corresponding to a stream of program instructions;

prefetch means for prefetching data values from memory addresses within a memory in accordance with a selected prefetch strategy that is one of a plurality of selectable prefetch strategies; and prefetch strategy selecting means, coupled to said instruction execution means and to said prefetch means, for:
  (i) detecting one or more characteristics of said stream of program instructions indicative of a probability that a given data access instruction within a program will be executed a plurality of times; and
(ii) selecting said selected prefetch strategy from among said plurality of selectable prefetch strategies in dependence upon said one or more characteristics.

Viewed from a further aspect the present invention provides a method of processing data, said method comprising the steps of:

executing in parallel a plurality of threads of program execution, each of said plurality of threads corresponding to a stream of program instructions;

prefetching data values from memory addresses within a memory in accordance with a selected prefetch strategy that is one of a plurality of selectable prefetch strategies;

detecting one or more characteristics of said stream of program instructions indicative of a probability that a given data access instruction within a program will be executed a plurality of times; and selecting said selected prefetch strategy from among said plurality of selectable prefetch strategies in dependence upon said one or more characteristics..

The above, and other objects, features and advantages of this invention will be apparent from the following detailed description of illustrative embodiments which is to be read in connection with the accompanying drawings.

DESCRIPTION OF THE EMBODIMENTS

Figure 1:
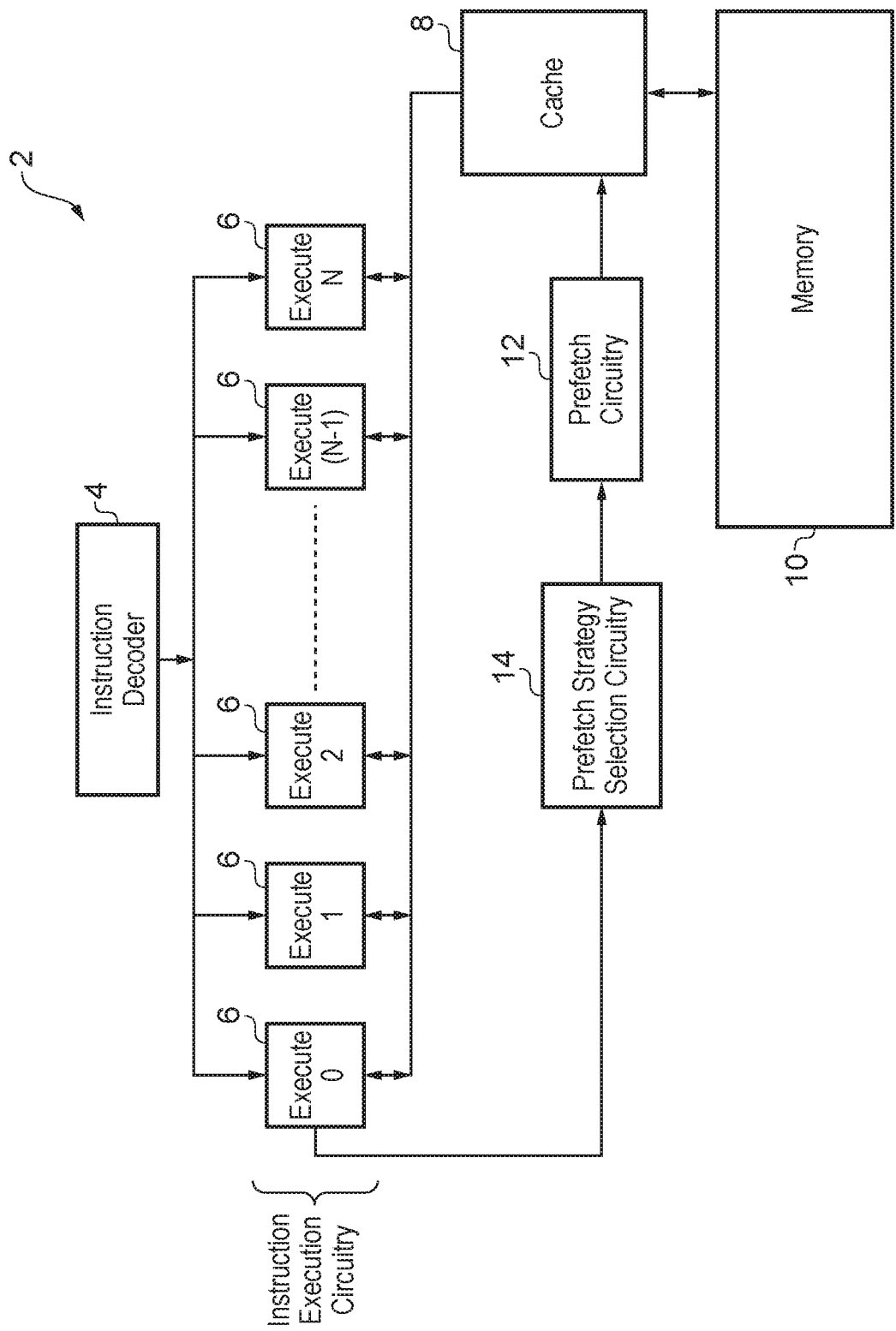
FIG. 1 schematically illustrates a data processing apparatus for performing SIMT processing.

FIG. 1 schematically illustrates a SIMT data processing apparatus 2 including instruction decoder circuitry 4 that is shared between multiple execution units 6 which together form instruction execution circuitry. The execution units 6 execute the same stream of program instructions in lockstep (where possible) to perform single instruction multiple thread processing yielding a high potential throughput of data processing. This type of SIMT processing will be familiar to those in this technical field and will not be described further herein.

The execution units 6 execute program instructions which can include data access instructions, such as load instructions and store instructions. These data access instructions access data within a cache memory 8 and a main memory 10. There is typically a relatively long latency associated with data access instructions, e.g. if a cache miss occurs. Accordingly, the data processing apparatus 2 includes prefetch circuitry 12 which functions to predict which data values within the cache 8 and memory 10 will be subject to data access operations and perform any fetches of these data values from the main memory 10 to the cache 8 before the data values are required. The prefetch circuitry 12 applies a prefetch strategy which may involve identifying patterns of data accesses, such as identifying stride values corresponding to the differences in the memory addresses between successive data accesses. Such patterns may in some circumstances also be correlated with thread identifiers and instruction identifiers (e.g. instruction addresses).

The data processing apparatus 2 includes prefetch strategy selection circuitry 14 coupled to the prefetch circuitry 12 and to at least one of the execution units 6. The prefetch strategy selection circuitry 14 serves to monitor the behaviour of the execution unit 6 to detect one or more characteristics of the program instructions being executed. These characteristics are indicative of at least a probability that a given data access instruction within a program will be executed a plurality of times by the execution unit 6. The one or more characteristics may be such that they definitely established that a given data access instruction has been executed a plurality of times or alternatively may merely indicate that there is an above threshold probability that the given data access instruction has been executed a plurality of times. Embodiments which either definitively determine that a given data access instruction is executed a plurality of times or identify a sufficiently high probability of this are all encompassed by the present techniques.

The prefetch strategy selection circuitry 14 upon detection of one or more characteristics which indicate at least a sufficiently high probability that a given data access instruction within a program thread will be executed a plurality of time uses this to select from among a plurality of selectable prefetch strategies a selected strategy which matches this circumstance. When the one or more characteristics are detected, then a long-running strategy is selected that is adapted to predict data values to prefetch when the stream of program instructions contains a given data access instruction that is executed a plurality of times e.g. correlating with thread ID and/or program instruction address. The default assumption when a thread first starts executing is the adoption of a short-running strategy which is adapted to predict data values to prefetch when a stream of program instructions has not been identified as containing a given data access instruction executed a plurality of times. The short-running prediction strategy adopted and the prefetch predictions made when applying that strategy are selected for a plurality of instances of a given thread executing across the different execution units 6. The long-running strategy may additionally factor into the prediction an identifier of an individual thread as well as an identifier of the particular data access instruction within that thread and so individual threads may have individual predictions. It will be appreciated that a wide variety of different prefetch strategies may be adopted and selected between by the prefetch strategy selection circuitry 14.

Figure 2:
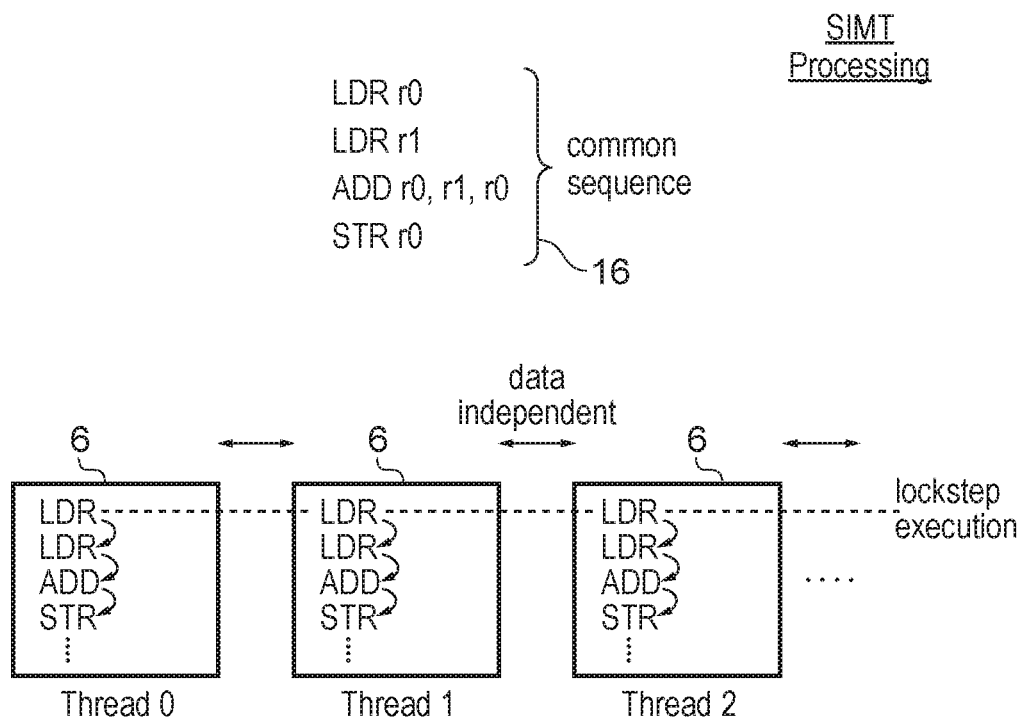
FIG. 2 illustrates how multiple threads execute the same code in lockstep upon independent data.

FIG. 2 illustrates SIMT processing executing a common sequence of program instructions 16 within multiple execution units 6. Each execution unit 6 executes the same instruction at the same time (or at substantially the same time) as the other execution units 6 with which it is executing in lockstep (synchronism). It will be appreciated that an individual thread may lose lockstep (synchronism) in some circumstances, such as generation of an exception or the taking of a branch which is not taken by other threads. The individual data which is processed by the different threads may be different. For example, a given overall processing workload may be divided between the different threads with each thread performing a small individual portion of the overall workload, such as processing a subset of the pixels needed to form an overall image.

Figure 3:
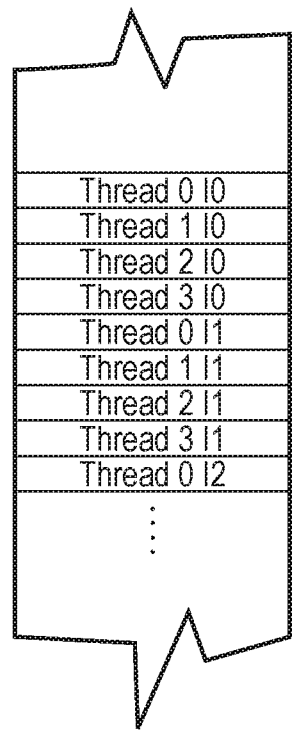
FIG. 3 illustrates fine-grained multithreading to which the present technique may also be applied.

FIGS. 1 and 2 correspond to processing in accordance with an SIMT approach. The present techniques also find utility in embodiments implemented using fine-grained multithreading as shown in FIG. 3. An example of such an embodiment would have a single processor which divides up its processing time between the execution of different threads which were interleaved with each other on a fine-grained basis (e.g. a few instructions at a time). The state associated with each thread can be separately maintained and switched in and out of use as the switch between threads takes place. For example, multiple register banks may be provided, with each register bank being associated with each thread. The prefetch circuitry within such a fine-grained multithreaded environment may apply a selectable one of the plurality of prefetch strategies which is selected by prefetch strategy selection circuitry in dependence upon one or more characteristics of the processing performed. The prefetch strategy selected is dependent upon the characteristics detected that indicate a given program instruction has been executed a plurality of times.

Figure 4:
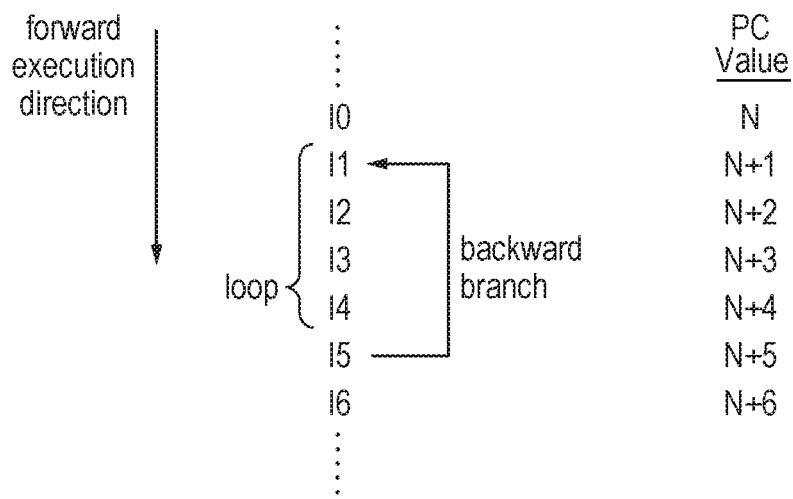
FIG. 4 illustrates a backward branch instruction that may be used to indicate a thread within which there is a high probability of the presence of a given data access instruction that is executed a plurality of times.

The one or more characteristics which may be detected to indicate that a given data access instruction is executed a plurality of times can vary considerably. FIG. 4 illustrates one example characteristic detected comprising a backward branch instruction 15 within the program instructions being executed. Detection of such a backward branch instruction 15 indicates that the program stream contains loops and accordingly that there is a high probability that a given data access instruction within that program stream will be executed a plurality of times. This can be used to select a prefetch strategy matched to this circumstance. Another example of such characteristics which may be detected is that the number of instructions executed within a thread exceeds a certain threshold number. Threads containing more instructions typically contained loops and accordingly are correlated with threads which include data access instructions that are executed a plurality of times. Accordingly, the number of instructions executed in a thread provides a probabilistic indication that the thread will contain a given data access instruction that executes multiple times. The execution of a loop may also be directly detected, such as by detecting particular loop instructions within certain instructions sets.

Another way of detecting one or more characteristics corresponding to multiple executions of a given data access instruction is to include look up circuitry configured to detect execution of that given data access instruction, e.g. the program addresses of identified data access instructions may be tracked and their repeated execution accordingly identified. One hardware efficient way of providing such look up circuitry is in the form of a Bloom filter.

Upon initialisation (start up) of the system the short-running strategy which assumes a given data access instruction is not repeatedly executed is selected as default. A switch to the long-running strategy takes place upon detection of the one or more characteristics indicative of repeated execution of a given data access instruction.

Figure 5:
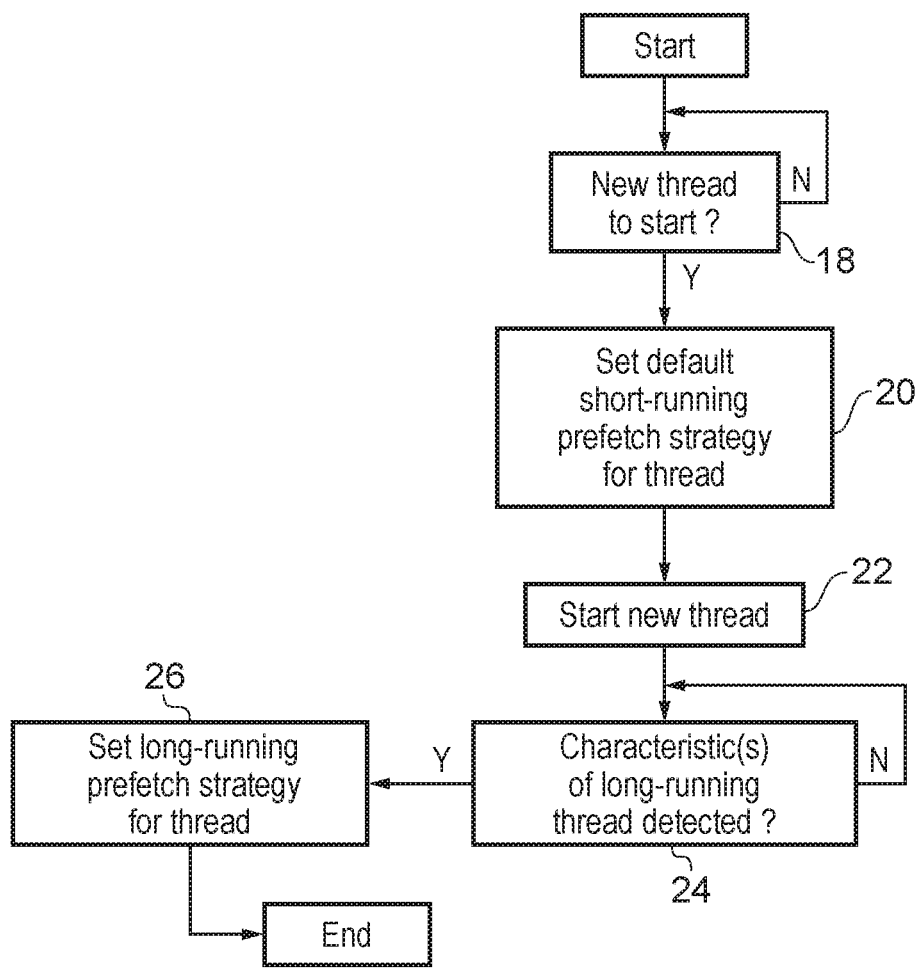
FIG. 5 is a flow diagram illustrating the selection of prefetch strategy in dependence upon the detection of one or more characteristics of long-running thread behaviour.

FIG. 5 is a flow diagram illustrating such operation. At step 18 processing waits until a new thread is to be started. At step 20 the short-running prefetch strategy is set as the initial default strategy for such the new thread. Step 22 then starts execution of the new thread. Step 24 repeatedly seeks to detect one or more characteristics of a long-running thread. If such a characteristic is detected, then processing proceeds to step 26 where the long-running prefetch strategy is selected for the thread.

In other embodiments which prefetch strategy to adopt is better controlled on a task (program stream) level rather than at the level of an individual thread. A task may in some embodiments have 1000 threads that all have the same initial program counter value. The selection of prefetch strategy is better performed on a more coarse level of the task in order to avoid the penalty of running with the wrong strategy for individual threads. Accordingly, in some embodiments the characteristics which control prefetch strategy selection are tracked at a task level rather than a thread level.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:
1. Apparatus for processing data, comprising:
   instruction execution circuitry configured to execute in parallel a plurality of threads of program execution, each thread of said plurality of threads corresponding to a stream of program instructions;
   prefetch circuitry configured to prefetch data values from memory addresses within a memory in accordance with a selected prefetch strategy that is one of a plurality of selectable prefetch strategies including a first prefetch strategy adapted to predict data values to prefetch and a second prefetch strategy adapted to predict data values to prefetch; and prefetch strategy selecting circuitry coupled to said instruction execution circuitry and to said prefetch circuitry and configured:

to select, for each thread of said plurality of threads, said first prefetch strategy as a default strategy;

to detect one or more characteristics of said stream of program instructions indicative that a given data access instruction within said stream of program instructions will be executed a plurality of times; and to select, for each thread of said plurality of threads, said second prefetch strategy upon detection of said one or more characteristics of said stream of program instructions indicative that said given data access instruction will be executed a plurality of times within said stream of program instructions, wherein:

the prefetch circuitry is arranged to make, when said first prefetch strategy is selected by the prefetch strategy selecting circuitry, prefetch predictions for a thread of said plurality of threads, that are independent of a thread identifier of said thread; and the prefetch circuitry is further arranged to make, when said second prefetch strategy is selected by the prefetch strategy selecting circuitry, prefetch predictions for said thread that are dependent on said thread identifier of said thread.

2. Apparatus as claimed in claim 1, wherein each of said plurality of threads executes in lockstep a common sequence of program instructions.

3. Apparatus as claimed in claim 2, further comprising instruction decoder circuitry coupled to the instruction execution circuitry and shared between said plurality of threads.

4. Apparatus as claimed in claim 2, wherein each of said plurality of threads executes without data dependence between said plurality of threads.

5. Apparatus as claimed in claim 1, wherein said instruction execution circuitry is configured to perform fine-grained multithreading.

6. Apparatus as claimed in claim 1, wherein said stream of program instructions has a normal forward execution order in which successive program instructions are executed in turn and said one or more characteristics include execution of a backward branch instruction to a target instruction located before said backward branch instruction relative to said normal forward execution order.

7. Apparatus as claimed in claim 1, wherein said one or more characteristics include execution of a program loop.

8. Apparatus as claimed in claim 1, wherein said stream of program instructions corresponds to a given thread that is one of a plurality of threads of program instructions and said one or more characteristics include that said given thread includes greater than a threshold number of program instructions that are executed before termination of said given thread.

9. Apparatus as claimed in claim 1, wherein said prefetch strategy selecting circuitry includes lookup circuitry configured to detect repeated execution within one of said plurality of threads of said given data access instruction.

10. Apparatus as claimed in claim 9, wherein said lookup circuitry is Bloom filter circuitry.

11. A method of processing data, said method comprising the steps of:

executing in parallel a plurality of threads of program execution, each thread of said plurality of threads corresponding to a stream of program instructions;

prefetching, by a prefetching circuitry, data values from memory addresses within a memory in accordance with a selected prefetch strategy that is one of a plurality of selectable prefetch strategies including a first prefetch strategy adapted to predict data values to prefetch and a second prefetch strategy adapted to predict data values to prefetch;

selecting, for each thread of said plurality of threads, said first prefetch strategy as a default strategy;

detecting one or more characteristics of said stream of program instructions indicative that a given data access instruction within said stream of program instructions will be executed a plurality of times; and selecting, for each thread of said plurality of threads, said second prefetch strategy upon detecting said one or more characteristics of said stream of program instructions indicative that said given data access instruction will be executed a plurality of times within said stream of program instructions, wherein said prefetching step further comprises:

when said first prefetch strategy is selected by a prefetch strategy selecting circuitry coupled to the prefetch circuitry, making prefetch predictions for each thread that are independent of a thread identifier of said thread; and when said second prefetch strategy is selected by a prefetch strategy selecting circuitry coupled to the prefetch circuitry, making prefetch predictions for each thread that are dependent on said thread identifier of said thread.

* * * * *